United States Patent [19]

Däumer et al.

[11] Patent Number: 4,527,523

[45] Date of Patent: Jul. 9, 1985

[54] SYSTEM FOR DAMPING BUCKING OSCILLATIONS OF AN AUTOMOBILE ENGINE

[75] Inventors: Rolf Däumer, Weil der Stadt; Ekkehard Feldmann, Hemmingen; Martin Person, Oberriexingen; Ernst Wild, Weissach-Flacht; Martin Zechnall, Schwieberdingen, all of Fed. Rep. of Germany

[73] Assignee: Robert Bosch GmbH, Stuttgart, Fed. Rep. of Germany

[21] Appl. No.: 545,531

[22] Filed: Oct. 26, 1983

[30] Foreign Application Priority Data

Nov. 23, 1982 [DE] Fed. Rep. of Germany ....... 3243235

[51] Int. Cl.³ .............................................. F02P 5/06
[52] U.S. Cl. .................................... 123/419; 123/436
[58] Field of Search ............. 123/419, 425, 435, 436, 123/480; 73/116

[56] References Cited

U.S. PATENT DOCUMENTS

| 4,178,891 | 12/1979 | Latsch et al. | 123/419 |
| 4,250,858 | 2/1981 | Jeenicke et al. | 123/480 |
| 4,329,960 | 5/1982 | Woodhouse et al. | 123/436 |
| 4,337,647 | 7/1982 | Radcliffe et al. | 73/116 |
| 4,345,559 | 8/1982 | Kuttner et al. | 123/436 |
| 4,377,998 | 3/1983 | Hartel et al. | 123/419 |

Primary Examiner—Parshotam S. Lall
Attorney, Agent, or Firm—Frishauf, Holtz, Goodman & Woodward

[57] ABSTRACT

Fluctuations of engine speed in the frequency range from 2 to 8 Hz, which produce "bucking" behavior of a motor vehicle, are detected by passing engine speed signals through a filter which reduces and delays the oscillations and a difference signal is then produced between the original and the processed speed signal in order to derive an alternating signal in the form of a square wave indicating the sign of a correction to be made to engine ignition timing for counteracting the bucking oscillations of engine speed. The square wave determines the sign of an anti-bucking ignition timing correction factor, of which the absolute value may be constant or may vary according to the sign of the correction and, if desired, also in accordance with engine operation parameters.

15 Claims, 2 Drawing Figures

SYSTEM FOR DAMPING BUCKING OSCILLATIONS OF AN AUTOMOBILE ENGINE

This invention concerns apparatus for reducing the usually low-frequency oscillations of a bucking nature that arise in the driving of an automobile at certain speeds and loads. Such oscillations are characterized by the speeding up and slowing down of an engine in a few cycles per second providing a jerking or bucking drive.

A system for dealing with this behavior of engines is described in U.S. Pat. No. 4,345,559. The system there disclosed provides for modification of the air/fuel ratio in synchronism with the bucking oscillations so as to counteract the latter. That operation has the disadvantage that the change in the fuel feed and its effect on the torque or the speed of the engine is very sluggish and consequently makes a satisfactory effect obtainable only with difficulty. Furthermore, there are disadvantages by the degradation of the exhaust gas output and the raising of the fuel consumption. Besides, the torque of the motor can be influenced only within narrow limits by variation of fuel injection without this variation itself exciting bucking oscillations (operation with lean mixture, or switching off of an injection valve).

A system for damping bucking oscillations is also known from U.S. Pat. No. 4,178,891, in which, along with modification of the fuel-air mixture there also takes place a modification of the ignition angle to oppose bucking. By ignition angle is meant the angle of crankshaft rotation from some reference position such as the upper dead point of the cylinder or a reference mark rotating with the crankshaft, to the crankshaft angular position at the moment of ignition in the cylinder. Drivers usually refer to ignition timing rather than ignition angle but, strictly speaking, the matter is one of crankshaft rotation angle, since the period of angular rotation varies with engine speed. This ignition shift, however, is produced in the system of the patent just mentioned independently of the frequency of the bucking and takes effect only in the direction of ignition timing retardation, resulting on one hand in a deterioration of the torque development and on the other hand in a damping effect that is "single-acting", rather than "double-acting" as such a countermeasure ought to be.

SUMMARY OF THE INVENTION

It is an object of the present invention to provide a double-acting system for actively counteracting bucking oscillations that develop in the operation of an automobile engine without impairing the development of torque by the engine, raising the consumption of fuel or allowing the exhaust gas discharge to deteriorate.

Briefly, the correction value angle is alternately added and subtracted to the ignition angle value effective in the ignition system with the alternation taking place so as to oppose the bucking oscillations. This is done by deriving from a signal representative of an engine operating parameter, such as engine speed, which is subject to variation in accordance with bucking oscillations, another signal representative of the bucking oscillations themselves and then applying an ignition angle correction value with a sign that corresponds to the sign of the oscillatory signal thus obtained.

The invention has made possible a very rapid and effective opposition of a counteracting force to the bucking oscillations by means of simple apparatus. This counteracting fits completely to the bucking oscillations and accordingly leads to a rapid damping, so that neither a detectable exhaust gas quality deterioration nor an increased fuel consumption results. The modifications of engine behavior by way of engine ignition timing makes possible a continuous adaptive torque control without unfavorable influence on the course of combustion.

It is particularly useful to detect the bucking oscillations by continuously forming the difference between the instantaneous speed signal and the speed signal as it appears after passage through a low-pass filter. The different signal then directly controls the direction of shift of ignition timing. Furthermore, the time constant of the low-pass filter can be made variable by operating parameters of the engine, such as temperature, load, speed, etc. and in that way an optimum fitting of the ignition timing counteraction of the bucking oscillations can be obtained. The delay characteristic of the filter rather than its attenuation is significant here.

Along with the dynamic counteraction of bucking by synchronous shifting of the ignition timing back and forth and the torque variation obtainable thereby, it is particularly advantageous to utilize passive precautions in addition, especially the use of a further low-pass filter for the load signal and/or the speed signal supplied to the ignition system and/or the fuel injection system of the engine. The low-pass filtering effect can be done by average value formation (averaging) and/or filtering of the parameters influenced by the bucking oscillations, with the integration period of averaging or the time constant of low-pass filtering being fitted to the frequency range of the bucking oscillations. In that manner the risk is avoided that by the engine control parameters themselves in the first place an influence on the bucking oscillations will already come into effect along with the formation of the injection and ignition data.

BRIEF DESCRIPTION OF THE DRAWINGS

The invention is further described by way of illustrative example with reference to the annexed drawings, in which.

The engine of an automobile, together with its drive train and drive wheels constitutes a system capable of oscillation because of their elastic properties, with the result that upon the occurrence of a disturbing event, for example, a spurt of fuel feed, a delay of combustion or a discontinuity in torque resulting from external causes (pothole or ruts in the road) this oscillating system can be excited into more or less damped oscillations. These oscillations as a rule lie in the frequency region between 2 and 8 Hz and are perceived as bucking of the vehicle or the engine. This frequency is set by the characteristics of the above-mentioned "motor-drive-train-tires-vehicle" system which is capable of oscillation. The excitation of bucking oscillations arises by torque generation by the motor varying with time or by different counter-torques encountered by the vehicle. Various methods for detecting bucking have become known, some of which are disclosed in the references mentioned in the introduction.

DESCRIPTION OF THE PREFERRED EMBODIMENT

Figure 1:
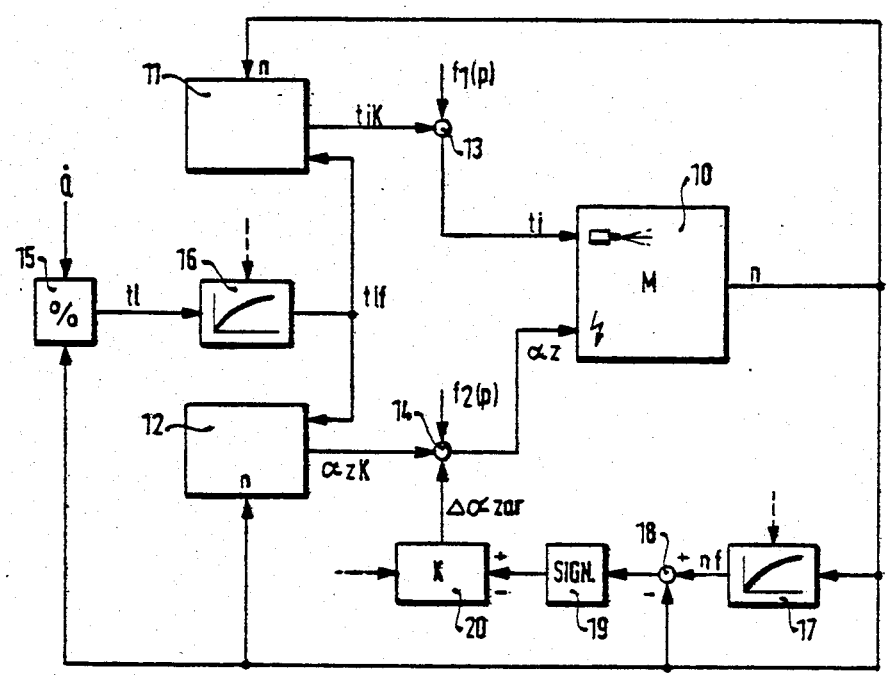
FIG. 1 is a circuit block diagram of an embodiment of the invention.

FIG. 1 shows an automobile engine 10 with input connections for a fuel injection control signal ti and an ignition angle signal $\alpha z$ for timing and initiating ignition, as well as an output connection for an engine speed signal n. The fuel injection and ignition timing shift are respectively performed in response to the signals ti and and $\alpha z$ are computer controlled with reference to data fields or the corresponding fuel injections and ignition timing characteristics. The field for the fuel injection data is stored in the fuel injection computer 11 and the field of ignition angle data is stored in the ignition computer 12. The two computers 11 and 12 may, of course, be combined, along with the other components shown in FIG. 1, if desired, in a single computer.

Characteristic-field-controlled fuel injection and ignition timing shift are well known from U.S. Pat. No. 4,250,858, for example, and have been embodied in BMW motor vehicles, moreover, since the year 1978.

Initial values $t_{ik}$ for fuel injection and $\alpha_{zk}$ for the ignition angle, which are in each case determined by characteristic fields, are modified in correction stages 13 and 14 of FIG. 1, shown as summing stages, by correction function f1 (p) and f2 (p) which depend upon engine operating parameters collectively designated p. This modification of the initially provided signals can take place additively or multiplicatively, although the stages 13 and 14 are illustrated in the manner commonly used for additive combination. Such correction functions as temperature compensation, start-up with a fuel mixture enrichment, acceleration enrichment, fuel cutoff during coasting (drivetrain driven from wheels), pressure functions and the like are brought into play in the correction operation and are applied to the fuel injection and ignition operation in a mode and to an extent in accordance with known principles and practices in the automotive art. As the result of these corrections there are produced corrected control signals ti and $\alpha v$ respectively for fuel injection and ignition.

The engine 10 generates at its mechanical output a driving torque that is in equilibrium, at constant engine speed, with the resistance forces acting on the vehicle (air resistance, friction resistance of the tires, of the transmission and of the driven aggregates and bearings, as well as resistance to acceleration) all of which are encountered as a resistance torque. If either the driving torque of the motor or one of the resistance torque components of the vehicle changes, a change of motor speed is produced corresponding to the equations of motion established by principles of mechanics, until a torque equilibrium is once more reached by raising or lowering the speed-dependent resistance torques. Since the principal part of the resistance torques appears at the drive wheels, the instantaneous engine speed that corresponds to the torque equilibrium is dependent upon the transmission and drive axle transmission ratios.

The speed value n provided in the engine 10 at the output shown in FIG. 1 is supplied both to the fuel injection computer 11 and to the ignition computer 12. This speed signal n is also supplied to a division stage 15 to which there is also supplied an air throughput signal $\dot{Q}$. A load signal $t1 = \dot{Q}/n$ is then formed by division in the stage 15 and supplied to a low-pass filter 16 which provides its output to the computers 11 and 12 as an engine load signal.

The engine speed signal n is supplied directly to a comparison stage 18 and also to the same comparison stage through another low-pass filter 17. The comparison stage 18 supplies the resulting difference signal through a sign-detecting stage 19 to an anti-bucking correction generator 20, the output of which is in turn supplied to the correction stage 14.

Figure 2:
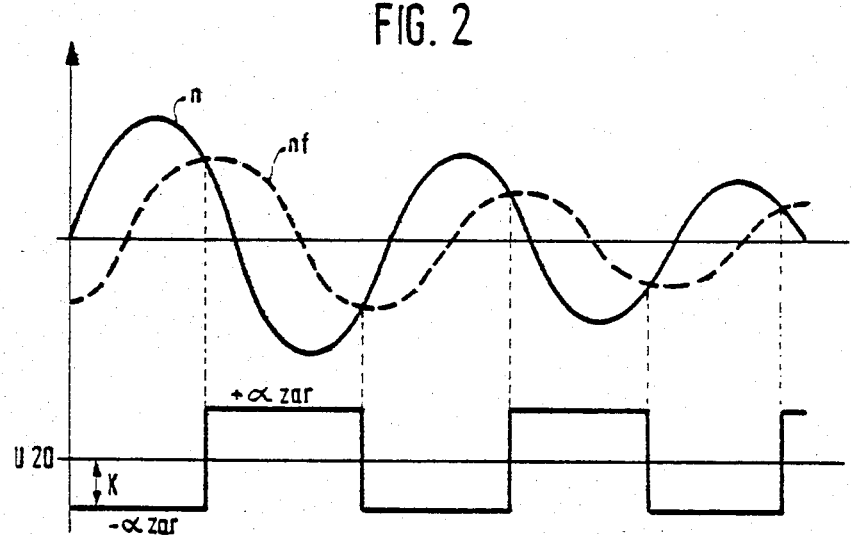
FIG. 2 is a graph of voltage against time showing the derivation of signals in the system of FIG. 1.

It is convenient to refer to FIG. 2 for explaining the dynamic ignition angle modification in accordance with the invention for active damping of the bucking phenomenon. The bucking oscillation makes itself evident as speed fluctuation, which is to say low-frequency ripple superimposed on the speed value signal n. By means of the low-pass filter 17 the fluctuation of the engine speed n is converted into a modified fluctuation nf. By obtaining the difference between the signal courses a continually alternating sign signal is obtained at the output of the sign detection stage 19, the alternations varying in the manner shown in the signal course U20 at the bottom of FIG. 2. The comparison stage 18 could be combined with the sign detection stage 19, for example, in a comparator switch circuit having two stable output states.

The alternating sign is then applied to the factor K in the bucking correction generator 20, in order to provide an alternating advance and retard ignition timing shift in accordance with the signal U20. This alternating shift of ignition timing is then superimposed upon the ignition angle $\alpha_{zk}$ obtained from the characteristic field, along with other correction functions f2 (p) that may be desired, thus to produce a resultant ignition angle signal $\alpha_z$. This fluctuating ignition angle counteracts the bucking oscillation, i.e., in the case of engine speed increase a torque decrease is produced by ignition timing retard and in the case of a speed decrease a torque increase is provided by ignition timing advance. If there is no bucking present, the output signal of the bucking correction generator 20 is equal to zero. The bucking oscillation is thus damped by the operation just described, to an extent determined by the factor K. By a suitable choice of the factor K the bucking oscillation can be damped before it becomes noticeable.

This factor K can, in the simplest case, be a constant. Another possibility is provided by the selection of two factors K, one of them for ignition timing advance and the other for ignition timing retard. Since the course of the torque in response to ignition angle is not linear, with two values of the factor K a suitable balance about a working point can be obtained. Finally, a still finer fitting of the correction can be obtained by having the factor K made dependent upon operating parameters of the engine, as for example, the engine speed, its temperature and its load, in accordance with some prescribed function provided through an ROM addressable by these parameters. In this manner, active damping of bucking can be optimized by counter-shift of ignition timing. Such a variation in accordance with engine operating parameters is indicated symbolically by the broken-shaft arrow leading from the left to the correction generator stage 20 in FIG. 1.

For optimizing the counteraction of bucking it is possible to vary not only the magnitude of the ignition timing shift alternation $\Delta\alpha_{zar}$, but also to optimize the instant (i.e. the phase) of the alternation between advancing and retarding shifts by variation of the time constant of the low-pass filter 17. This possibility is likewise shown by a broken-line arrow in FIG. 1 (at the top of the block designating the low-pass filter 17).

Along with the active damping of the bucking phenomenon, passive damping can additionally be provided. Since the duration of each fuel injection and the ignition angle of the spark depend directly from engine speed and load respectively, these magnitudes themselves can dynamically change their values with the frequency of the bucking oscillation when the motor-drivetrain-etc. system is excited into bucking behavior, producing a feedback that may have a phase suitable for self-excitement, or at least amplification of bucking oscillations. For this reason the load signal $t_l$ as originally generated in the division unit 15 is filtered in the low-pass filter 16 before being supplied to the computers 11 and 12. The low-pass filter does not need to be a passive network as the word "filter" connotes, but may be an integrator such as can be easily provided by an operational amplifier, or some other kind of an averaging circuit. Preferably, it operates by suitable averaging with a time constant at least roughly fitted to the frequency range of the bucking oscillation. Filtering with a low-pass characteristic produces a corrected load signal $t_{lf}$ for processing in the computers 11 and 12. Here also, optimization can be provided by variation of the time constant of the low-pass filter in response to engine operation parameters. Furthermore, it is possible to filter the engine speed signal n itself by a low-pass filter before supplying it to the computers 11 and 12.

It should further be mentioned that in order to detect the bucking oscillations by comparison of the speed signal with a filtered speed signal coming out of a low-pass filter, it is also possible to utilize comparison of the speed signal with an averaged speed signal.

Above a value of load or of speed, or both, that can safely be fixed it is advantageous to disable the modification of addition and fuel injection by the anti-bucking system, since in the higher load and speed range there is usually no more bucking and, furthermore, undesired effect can thus be prevented that may occur, for example, when the vehicle is strongly accelerated.

Finally, the provisions according to the invention for suppressing bucking in automobile engine operation and of course be combined in various ways with known anti-bucking schemes, as is particularly plain in the case of fuel injection variation mentioned in the introduction to this specification.

Although the invention has been described with reference to a particular illustrative example, it will be understood that variations and modifications are possible within the inventive concept.

We claim:

1. Apparatus for damping low-frequency bucking oscillations in the operation of a motor vehicle having an electrical ignition system, including means for producing a signal corresponding to an operating parameter of said engine indicative of said oscillations and means for control of at least one control magnitude of said engine in a manner counteracting said oscillations, said apparatus further comprising, in a system in which said control magnitude is the ignition angle ($\alpha$) determining ignition timing:

means for deriving from said signal an alternating derived electrical signal having a phase relation to said oscillations suitable for indicating the appropriate direction for counteraction of said oscillations during cycles of the latter, and means responsive to said derived signal for applying, with a sign alternating with the alternations of said derived signal, an ignition angle correction value ($\Delta\alpha{zar}$) for said ignition angle, and thereby advancing ignition timing when said ignition cycle correction value is applied with a positive sign and retarding ignition timing when said ignition angle correction value is applied with a negative sign.

2. Apparatus according to claim 1, in which said ignition angle correction value is of constant absolute magnitude.

3. Apparatus according to claim 1, in which said ignition angle correction value is a difference value according to whether it is applied with positive or negative sign, but when applied with the same sign is always of the same magnitude.

4. Apparatus according to claim 1, in which said means for applying an ignition angle correction value is constituted to apply a correction value dependent upon operating parameters of said engine.

5. Apparatus according to claim 4, in which said means for applying an ignition angle correction value is constitutud so as to apply a correction value which also varies according to the sign of the correction.

6. Apparatus according to claim 1, in which said means for producing a signal corresponding to an operating parameter of said engine indicative of said operations is constituted as means for producing a signal corresponding to engine speed and in which said means for deriving from said signal an alternating derived signal comprises means for passing said signal through a low-pass filter (17) and for producing a difference signal representative of the difference between said speed signal before passage through said filter and said speed signal after passage through said signal.

7. Apparatus according to claim 6, in which means are included for modifying said difference signal and to produce an alternating derived signal suitable for using only its sign in said means responsive thereto for applying an ignition angle correction value.

8. Apparatus according to claim 6, in which means are included for modifying the time constant of said low-pass filter in accordance with at least one parameter of said engine.

9. Apparatus according to claim 6, in which means are included for providing an engine load signal and also a second low-pass filter through which said engine load signal is caused to pass before said engine load signal is applied to means, included in said engine for producing said ignition angle control magnitude.

10. Apparatus according to claim 9, in which said engine speed signal and the output of said second low-pass filter resulting from passage of said engine load signal therethrough are both applied to means for controlling fuel injection in said engine.

11. Apparatus according to claim 10, in which said second filter is provided with means for varying its time constant in accordance with at least one engine operating parameter.

12. Apparatus according to claim 11, in which said second filter is provided with means for varying its time constant in accordance with at least one engine operating parameter.

13. Apparatus according to claim 1, in which means are provided for blocking the operation of said correction value applying means while the speed of said engine exceeds the predetermined minimum value.

14. Apparatus according to claim 1, in which means are provided for blocking the operation of said correction value applying means while the load on said engine exceeds a predetermined minimum value.

15. Apparatus according to claim 1, in which said signal-deriving means includes a wave delay circuit and means subjecting said signal to said wave delay circuit and for comparing said signal with the output of said delay circuit in a comparator switch arranged to switch back and forth between two output states at successive crossovers of the compared inputs.

* * * * *